(12) United States Patent
Chang

(10) Patent No.: US 7,024,496 B2
(45) Date of Patent: Apr. 4, 2006

(54) OPERATION METHOD OF INPUT/OUTPUT PAD WITH MONITORING ABILITY

(75) Inventor: Nai-Shung Chang, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 0 days.

(21) Appl. No.: 10/930,117

(22) Filed: Aug. 30, 2004

(65) Prior Publication Data

US 2005/0027895 A1    Feb. 3, 2005

Related U.S. Application Data

(62) Division of application No. 09/948,871, filed on Sep. 7, 2001, now Pat. No. 6,826,635.

(30) Foreign Application Priority Data

Nov. 21, 2000 (TW) .............................. 89124636 A

(51) Int. Cl.
*G06F 3/00* (2006.01)
*G06F 13/00* (2006.01)
*H03K 19/003* (2006.01)
*H03K 17/16* (2006.01)

(52) U.S. Cl. .................... 710/32; 710/36; 713/500; 375/295; 326/9; 326/21; 326/31; 365/189.01; 365/189.08

(58) Field of Classification Search ................ 710/15, 710/16, 32, 36; 712/225; 713/500; 714/750, 714/819, 821, 824; 375/211, 295, 296; 326/9, 326/21, 22, 26, 31; 365/189.01, 189.06, 365/189.08, 191, 193, 195, 196, 198, 206; 327/74, 199
See application file for complete search history.

(56) References Cited

U.S. PATENT DOCUMENTS

| | | | | |
|---|---|---|---|---|
| 4,758,739 A | * | 7/1988 | Ovens et al. | 327/199 |
| 4,968,902 A | * | 11/1990 | Jackson | 327/74 |
| 5,097,147 A | * | 3/1992 | Stuebing et al. | 327/74 |
| 5,134,314 A | * | 7/1992 | Wehrmacher | 326/9 |
| 5,399,912 A | * | 3/1995 | Murata et al. | 327/94 |
| 5,418,746 A | * | 5/1995 | Choi | 365/189.05 |

* cited by examiner

*Primary Examiner*—Kim Huynh
*Assistant Examiner*—Tanh Q. Nguyen
(74) *Attorney, Agent, or Firm*—J.C. Patents

(57) ABSTRACT

An I/O pad has a data transmitting circuit, a data monitoring control circuit, and a control selection circuit. The control selection circuit controls the data transmitting circuit. When it is enabled, data in the data transmitting circuit are exported to a receiving circuit. When it is disabled, data exportation stops. The data monitoring circuit receives signals of the data transmission circuit and export signals to the control selection circuit. The data monitoring circuit judges whether the data transmission is under a stable condition. If it is not, an unstable signal is exported to a first input end of the control selection circuit. A second input end of the control selection circuit receives an output enabling signal. When the data transmission is stable and the output enabling signal indicates a disable status, the control selection circuit disables the data transmitting circuit. Otherwise, the control selection circuit enables the data transmitting circuit.

2 Claims, 3 Drawing Sheets

OPERATION METHOD OF INPUT/OUTPUT PAD WITH MONITORING ABILITY

CROSS-REFERENCE TO RELATED APPLICATION

This application is a divisional application of, and claims the priority benefit of, U.S. application Ser. No. 09/948,871, filed on Sep. 7, 2001, now U.S. Pat. No. 6,826,635.

BACKGROUND OF THE INVENTION

1. Field of Invention

The present invention relates to an integrated circuit. More particularly, the present invention relates to an I/O pad of an integrated circuit. The I/O pad can export signals with a delay time.

2. Description of Related Art

The usual manner for transmitting data needs an enabling control circuit device, so as to control the ON/OFF status of the transmitting circuit. This can save consumption of the resource of the data bus in integrated circuit (IC) operation. The data bus is the data transmitting bridge between two IC's, so as to allow the data to be transmitted in proper efficiency.

While the data is under transmission, the enabling control circuit would enable a data transmitting circuit, so that the data transmitting circuit starts to transmit desired data to the data bus. During the transmitting period, the enabling control circuit continuously drives the data transmitting circuit, so as to avoid interruption of data transmission. After the data are completely transmitted, the enabling control circuit then issues an disable signal, which can stop the operation of data transmission and puts the circuit at the OFF status, so that the resource for operating the IC can be saved.

In the above manner, it has no difficulty or defect for the operation at low frequency. Data can be successfully transmitted from one circuit to another circuit. However, the high frequency transmitting technology has greatly developed for use. In the data transmitting process operated at high frequency operation process, the delay time due to a delay of the data bus could be too large when comparing with time of the high frequency. In this situation, while the data are still under transmitting, the IC has finished data transmitting. By the normal operation, the enabling control circuit then turns OFF the IC circuit. However, the data are not yet completely transmitting to the data bus. This also means that the voltage level still does not achieve a stable status. The driving voltage does not continue to drive the data transmitting action, due to the OFF of the IC circuit.

With respect the foregoing operation principle, FIG. 1 shows the structure diagram of a conventional I/O pad. In FIG. 1, INT data are input to the I/O pad. By the path of data bus 12, input data are output to the desired IC. The enabling control circuit 14 in the I/O pad 10 judges the INT data to determine whether data are still continuously transmitting data to the I/O pad 10. Accordingly, the enabling control circuit 14 also issues an output enabling signal, which triggers the tri-state buffering circuit 16 to the data bus 12. When the data transmission from INT has finished, the enabling control circuit 14 does not issues the output enabling signal. As a result, the tri-state buffering circuit 16 stops operating, and the I/O pad has finished one action of data transmission.

FIG. 2 is the output signal waveform for the conventional I/O pad. In FIG. 2, data at the firs period 20, the second period 22, the third period 24 can be successfully transmitted. However, during the fourth period 26, since the delay of transmission occurs, the data haven't been completely transmitted to the data bus yet, but the I/O pad has been Off. This causes the data within the fourth period is incomplete. This problem occurs at the operation under high frequency.

SUMMARY OF THE INVENTION

The invention provides an I/O pad with monitoring ability on the data transmission, and a method for driving the I/O pad. When data are transmitted between the circuits, the I/O pad can prolong the transmission time, so that the data are assured to be successfully transmitted without affection from the delay time of the data bus. The data can be smoothly transmitted.

The invention provides an I/O pad with monitoring ability on the data transmission. The I/O pad includes a data transmitting circuit, a data monitoring control circuit, and a control selection circuit. The control selection circuit controls the data transmitting circuit at the control end, so as to enable or disable the transmission. When it is enabled, data in the data transmitting circuit are exported to a receiving circuit. When it is disabled, data exportation stops. The data monitoring circuit receives signals of the data transmission circuit and export signals to the control selection circuit. The data monitoring circuit judges whether the data transmission is under a stable condition. If it is not yet, an unstable signal is exported to a first input end of the control selection circuit. A second input end of the control selection circuit receives an output enabling signal. The output end of the control selection circuit is connected to the control end of the data transmitting circuit. When the data transmission is at stable status and the output enabling signal indicates a disable status, the control selection circuit disables the data transmitting circuit. Otherwise, the control selection circuit enables the data transmitting circuit.

The present invention provides a method for driving an I/O pad, the method includes providing an enabling signal. When the enabling signal is at the enabling state, the I/O pad drives the data transmission. The data transmitting status is detected. When the data transmitting status is at a stable condition and the enabling signal is at disable status, the I/O pad stops transmitting data. The method to determine whether the data transmitting status is a stable condition includes first providing a high level voltage and a low level voltage, where the low level voltage is less than the high level voltage. When the voltage level during period for transmitting data is higher than the high level voltage or less than the low level voltage, it is a stable status.

The I/O pad of the invention associating the operation method has the monitoring ability to judge whether the data transmitting status is stable or not. According to judged status, it determines whether the data are driven to transmit to the data bus or not. This can assure a stable and complete data transmission without being affected by the delay time of the data bus. This also avoid that the integrated circuits are driven for too long, consuming the resource of integrated circuit.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
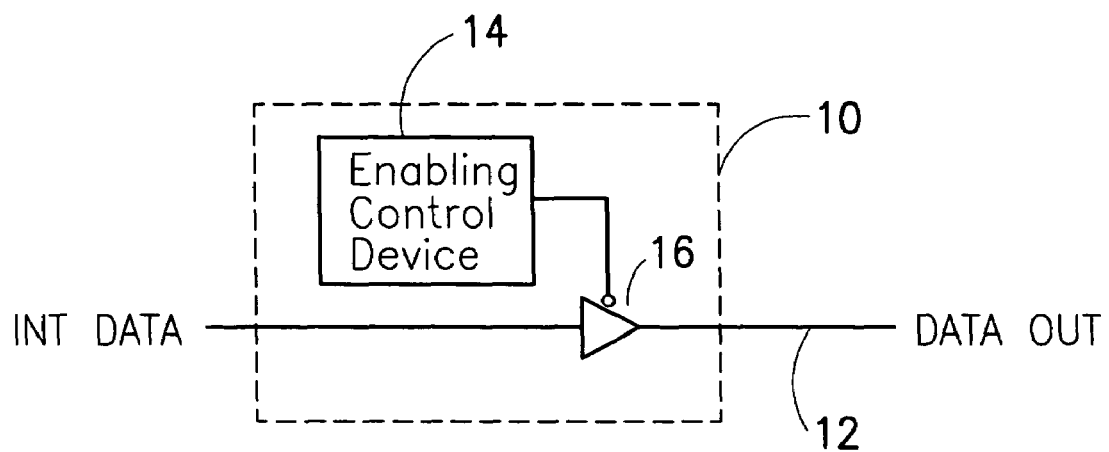
FIG. 1 is a block diagram, schematically illustrating the structure of the conventional I/O pad.
Figure 2:
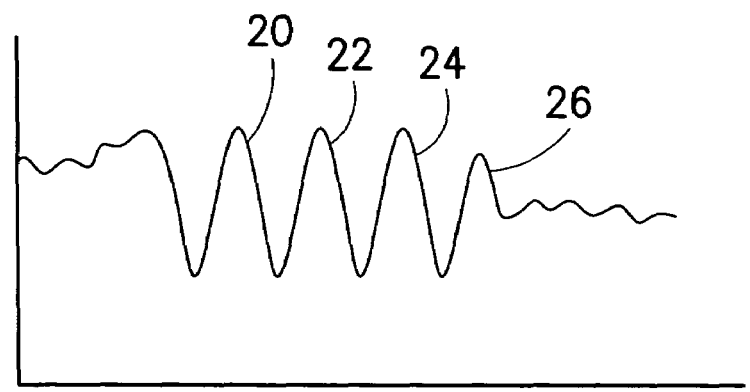
FIG. 2 is the waveform for the conventional I/O pad.
Figure 3:
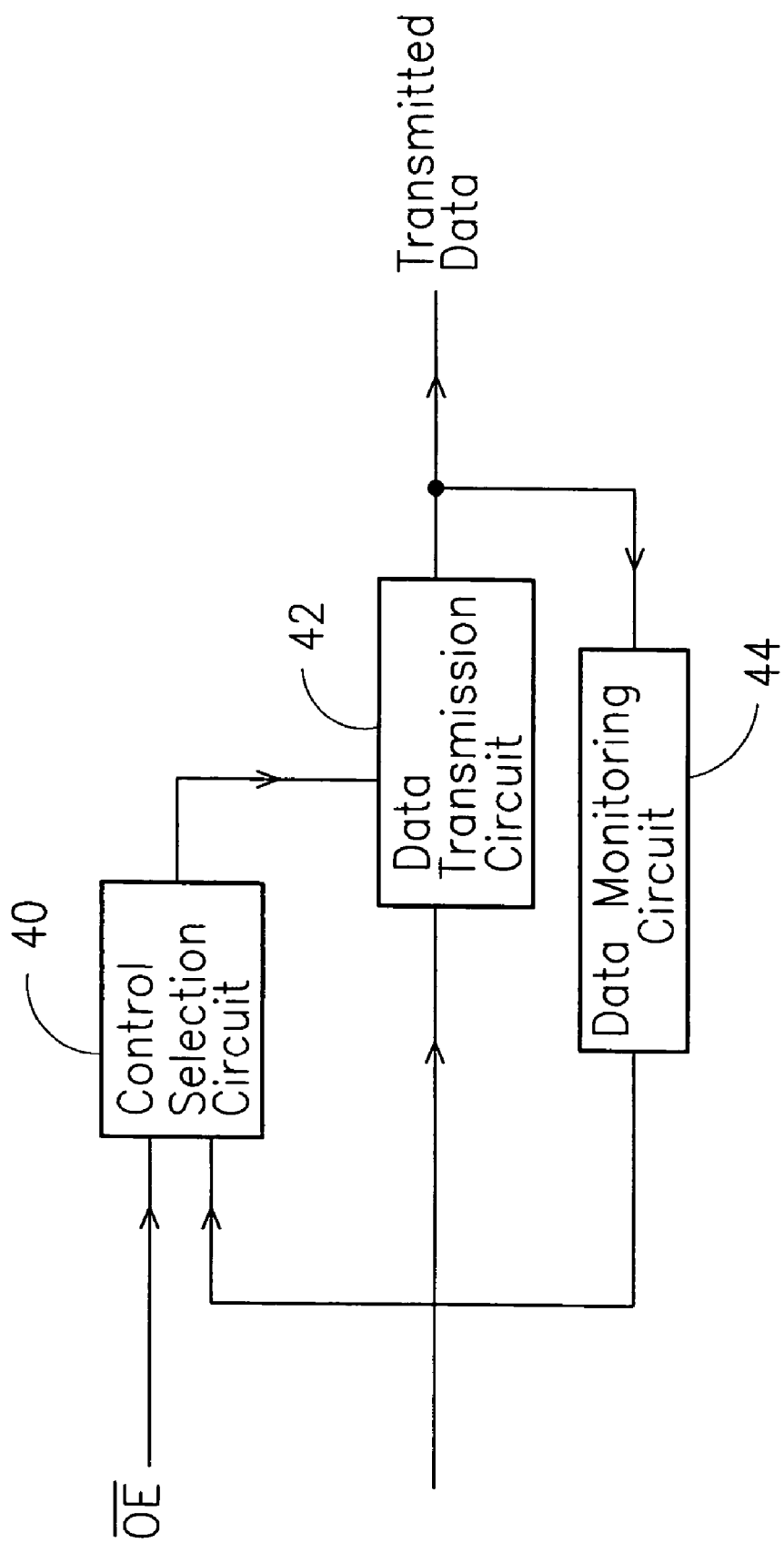
FIG. 3 is a block diagram, schematically illustrating the structure for an I/O pad according to one preferred embodiment of this invention.

FIG. 3 is a block diagram, schematically illustrating the structure for an I/O pad according to one preferred embodiment of this invention. In FIG. 3, the I/O pad structure includes a data transmitting circuit 42, a data monitoring circuit 44, and a control selection circuit 40.

The data transmitting circuit 42 has a data receiving end, a control input end, and a data output end. The signal on the control input end can enable or disable the data transmitting circuit 42. When the data transmitting circuit 42 is enabled, the data output end exports data received from the receiving end. This also means that the data transmitting circuit 42 is continuously driven. When the data transmitting circuit 42 is disabled, data transmission stops.

The data monitoring circuit 44 has a transmitted-data input end and a monitoring-signal output end. The transmitted-data input end is connected to the output end of the data transmitting circuit 42, used to detecting the data transmission status and to determine whether the data transmission status is stable or not. The data monitoring circuit 44 exports an unstable signal from the monitoring-signal output end to indicate an unstable status for the data transmission.

The control selection circuit 40 has a first input end, a second input end, and an out putt end. The first input end of the control selection circuit 40 is connected to the monitoring-signal output end of the data monitoring circuit 44 for receiving the unstable signal. The second input end of the control selection circuit 40 receives an enabling signal typically generated by an integrated circuit. The output end is connected to the control input end of the data transmitting circuit 42, so as to enable or disable the data transmitting circuit 42. When the output of the control selection circuit 40 is at the enabling condition, it enables the data transmitting circuit 42 and driving the data to the data bus. When the output of the control selection circuit 40 is at the disabling condition, the No42 42 stops transmitting data. This indicates that the integrated circuit does not be necessary to transmitting data to the data bus. When the enabling signal is at disabling status, this indicates that the data transmission status is at stable condition. The control selection circuit 40 enables the data transmitting circuit 42, so that data of the IC can be continuously transmitted to the data bus.

The function of control selection circuit 40 is used to describe in the following. When the data transmitting status is still unstable, the data transmitting circuit 42 would continuously drive the function of transmitting data without interruption. This allows the data can be transmitted maintain integrity. After the data are completely transmitted, the data monitoring circuit 44 then informs the control selection circuit 40 about the finish of data transmission. The data transmitting circuit 42 then stops. As a result, the operation of data transmission is highly efficient without consuming the operational resource. Data can also maintain integrity.

Figure 4:
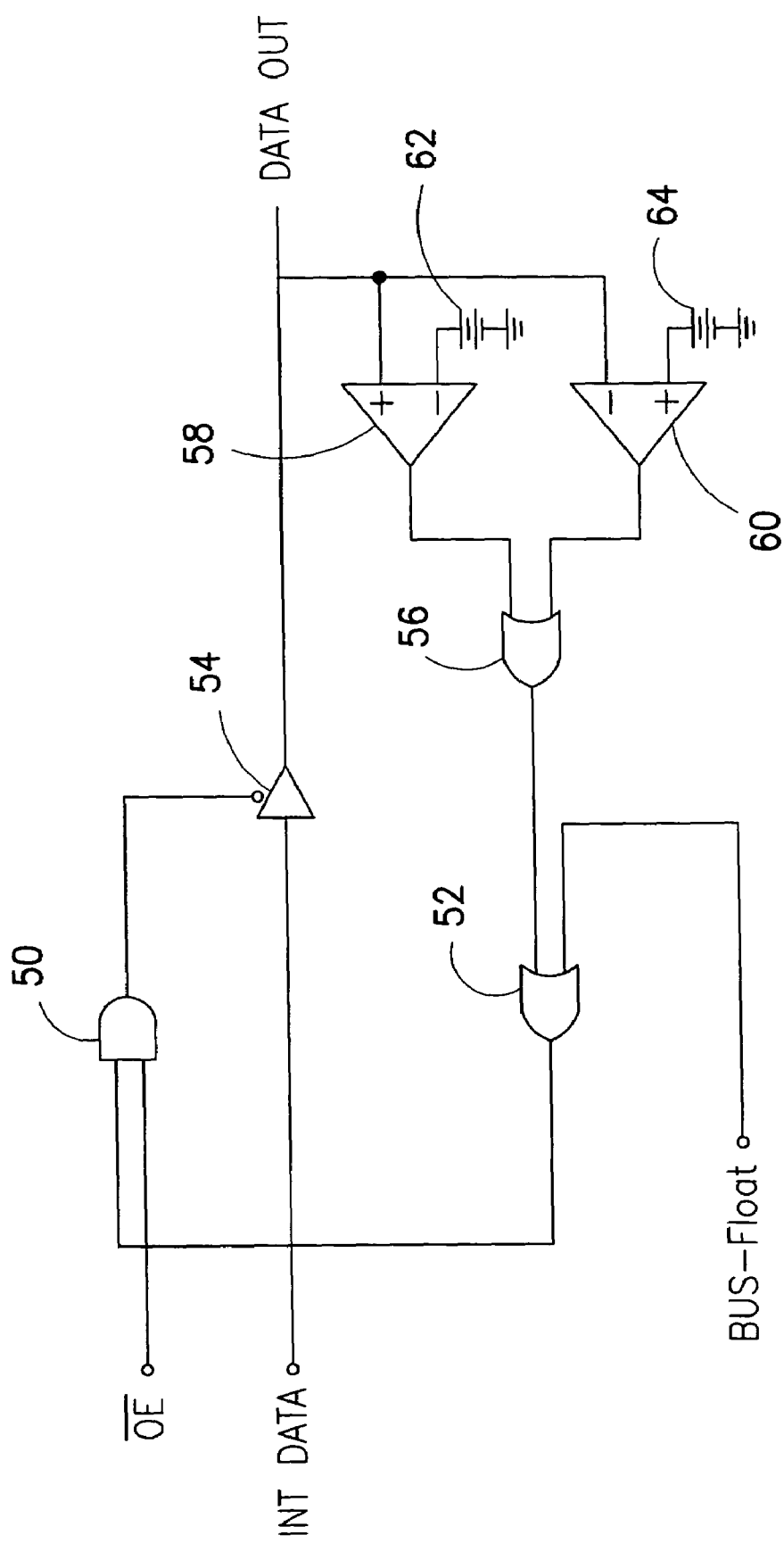
FIG. 4 is a circuit, schematically illustrating the I/O pad, according to one preferred embodiment of this invention.

FIG. 4 is a circuit, schematically illustrating the I/O pad, according to one preferred embodiment of this invention. In FIG. 4, the foregoing data monitoring circuit 44 preferably includes a high voltage comparator 58, a low voltage comparator 60, and OR gates 52, 56. The positive end of the comparator 58 is connected to the transmitting line of DATA OUT, and the negative end of the comparator 58 is connected to power device 62, which maintains a voltage of 2.8 volts. The comparator 58 is used to compare the high level of voltage at the DATA OUT during data transmission. The negative end of the comparator 60 is also connected to the transmitting line of DATA OUT, and the positive end of the comparator 60 is connected to a power device 64, which maintains a voltage of 0.2 volts. The comparator 60 is used to compare the low level of voltage at the DATA OUT during data transmission. The two outputs of the comparators 58, 60 are inputted to the OR gate 56. In this manner, when the voltage level at DATA OUT is greater than 2.8 V, the comparator 58 exports a high level voltage. Also and, if the voltage level at DATA OUT is less than 0.2 V, the comparator 60 exports a high level voltage, the OR gate 56 also export a high level voltage, the data transmission is assured to been achieved to the stable condition. Otherwise, the OR gate 56 exports a low level voltage, indicating the unstable condition for the data transmission.

The output of the OR gate 56 is further connected to one input end of the OR gate 52. The other input of the OR gate 56 is connected to a bus-floating control signal BUS-Float of the data bus. When the control signal BUS-Float is at enable state (high level), it indicates that the data monitoring circuit 44 is not desired for operation. The output of the OR gate 52 maintains at the high voltage level. This also means that when the output of the OR gate 52 is at the low voltage level, the unstable signal for data transmission is at the enable status, indicating that the data transmission is not at the stable condition yet. In the foregoing, the arrangement of the OR gates are only taken as an example. The skilled artisans should be able to modify the OR gate into another design with the same function for allowing the data monitoring circuit 44 to be continuously operated.

Moreover, two input ends of an AND gate 50 receives the output of the OR gate 52 and an output enabling signal $\overline{OE}$. When the enabling signal $\overline{OE}$ is at the enabling level, that is, a low voltage level, the output of the AND gate 50 is at the low voltage level. The tri-state buffer 54 then can drive the data bus. Likewise, when the output of the OR gate 52 is at the low voltage level, that is, the unstable signal for data transmission is at the enable status. This also indicates that when the data transmission is at unstable condition, the output of the AND gate 50 is at the low voltage level. This causes the tri-state buffer 54 can continuously transmit data to the data bus.

In FIG. 4, the data transmitting circuit 42 shown in FIG. 3 is the tri-state buffer 54. The high voltage level is 2.8V and the low voltage level is 0.2V. The control selection circuit 40 shown in FIG. 3 is the OR gate 50. As can be understood by the skilled artisans, various modifications of circuit design with the same desired function is still within the scope of the design principle of the invention. For instance, quantities of the high voltage level and the low voltage level can vary according to different requirement for the different data buses.

In summary, the method of the invention includes providing an output enabling signal. When the enabling signal is at the enabling state, the I/O pad drives the data transmission. Then, the data transmitting status is detected. When the data transmitting status is at a stable condition and the enabling signal is at disable status, the I/O pad stops transmitting data.

The algorithm for determine whether the data transmission status is at the stable condition or not includes providing a high level voltage and a low level voltage, where the low level voltage is less than the high level voltage. When the voltage level during period for transmitting data is higher than the high level voltage or less than the low level voltage, it is a stable status.

The invention can improve the efficiency of the data transmitting between two integrated circuit through the data bus. The conventional drawback of incomplete data transmission, which is due to the time delay of response time of data bus when the integrated circuit device has finished for transmitting data, can be successfully avoided. The data can be completely transmitted without affection of the delay of the data bus.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for operating an I/O pad, which is used for transmitting data, said method comprising:
   providing a transmitting enabling signal at stable and unstable conditions wherein the data transmission function is performed during the unstable data transmission condition;
   transmitting said data through said I/O pad when said transmitting enabling signal is at an enabling level;
   detecting said data for transmitting; and
   stopping transmitting data when said transmitting enabling signal is at an disabling level and said data is transmitted at a stable condition.

2. The method for operating an I/O pad of claim 1, wherein an algorithm for determining whether said data is transmitted under a stable condition or not comprises:
   providing a first voltage level;
   providing a second voltage level, wherein said first voltage level is higher than said second voltage level; and
   setting said stable condition for data transmission when a voltage level for transmitting data is higher than said first voltage level or less than said second voltage level.

* * * * *